No. 669,227.
C. A. & G. A. ANDERSON.
WHEEL TIRE TIGHTENER.
(Application filed July 5, 1900.)
Patented Mar. 5, 1901.
(No Model.)
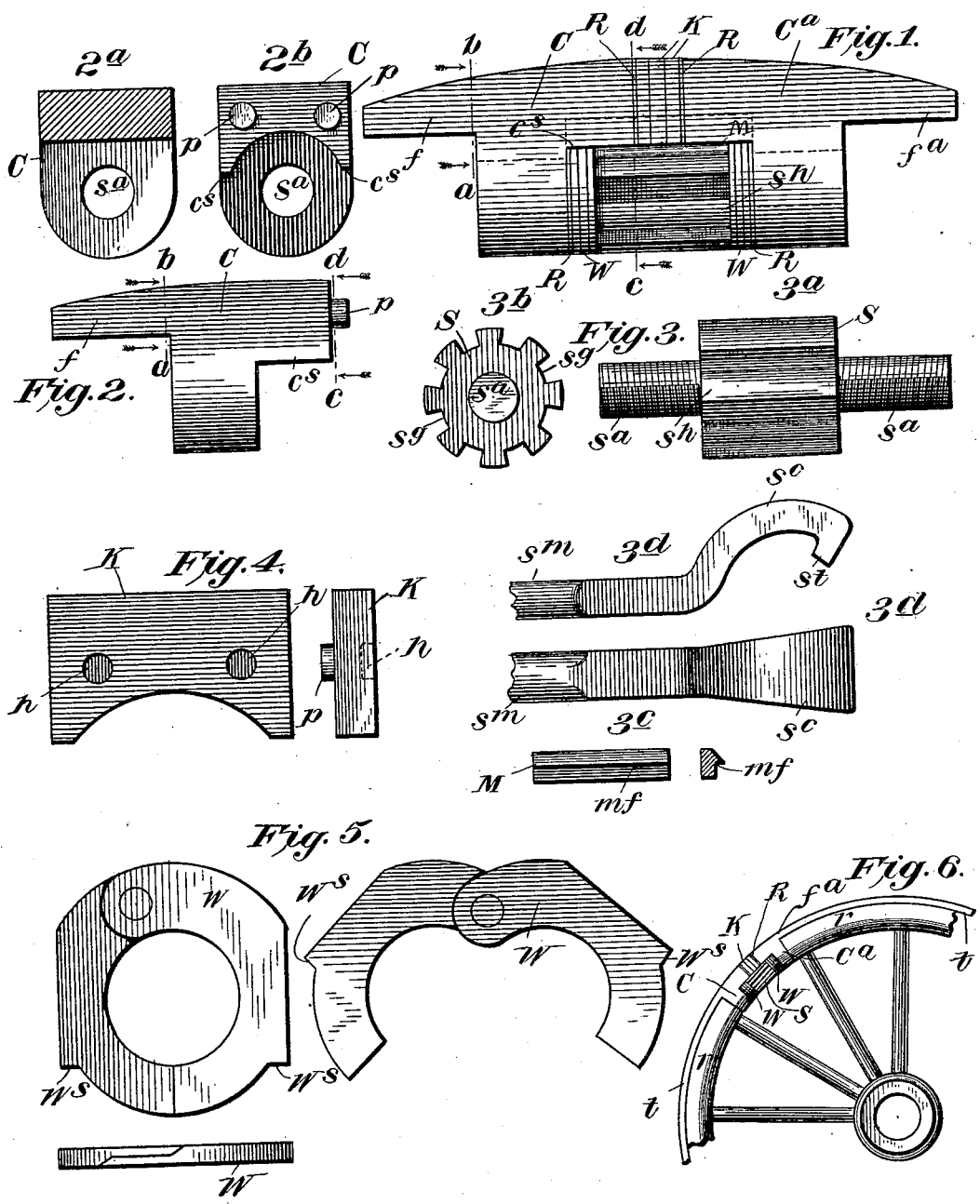
Witnesses
Elmer Seavey
R. V. Bishop
Inventors,
Charles A. Anderson,
and Gustaf A. Anderson,
By Davis & Davis,
Attorneys.

UNITED STATES PATENT OFFICE.

CHARLES A. ANDERSON AND GUSTAF A. ANDERSON, OF PORTLAND, OREGON.

WHEEL-TIRE TIGHTENER.

SPECIFICATION forming part of Letters Patent No. 669,227, dated March 5, 1901.

Application filed July 5, 1900. Serial No. 22,631. (No model.)

*To all whom it may concern:*

Be it known that we, CHARLES A. ANDERSON and GUSTAF A. ANDERSON, citizens of the United States, residing at the city of Portland, in the county of Multnomah, State of Oregon, have invented a certain new and useful Improvement in Wheel-Tire Tighteners, of which the following is a specification, reference being had to the accompanying drawings.

This invention relates to a new manner of tightening the iron tires on wagon-wheels, which through shrinkage of the wooden work will become loose in course of time. We attain this object by the mechanism illustrated in the accompanying drawings, in which—

Figure 1 is a view of the tire-tightener. Fig. 2 is one of the clutches forming the main body of the tightener, and in this Fig. $2^a$ is a section at $ab$, and Fig. $2^b$ is an end view at $cd$. Fig. 3 shows the tightening-screw connecting the two clutches, and in this Fig. $3^a$ is a full view of the screw when removed from the clutches, Fig. $3^b$ is an end view of same, and Fig. $3^c$ is a key used to keep the screw in position when the same is tightened. Fig. $3^d$ shows the shape of the wrench whereby the screw is turned for tightening. Fig. 4 shows the shape of one of the outer keys forming part of tire and is about full size. Fig. 5 shows one of the inner washers of full size when opened and closed. Fig. 6 shows the tire-tightener in position on a wheel.

Similar letters refer to similar parts throughout the several views.

Between two fellies of a wagon-wheel rim $r$ and directly opposite to the weld of tire $t$, as shown in Fig. 6, two clutches C and $C^a$, of the width, depth, and shape of a wagon-wheel rim $r$, with its tire $t$, are inserted and connected by a turnable twin screw S, whereon the threads of screw $S^a$ are reversed to the threads of screw $S^b$. These clutches C and $C^a$ are provided with flanges $f$ and $f^a$, which are welded securely to the wheel-tire $t$, and the clutches C and $C^a$ are shaped to the rim $r$ of the wheel, so that when the tire $t$, with the welded-in clutches C and $C^a$, is pressed onto the wheel-rim $r$ this "tire-tightener" forms a whole with the tire $t$ and rim $r$.

Should the tire $t$ become loose in course of time, we can retighten the slack by removing first the middle one of the keys K, and also two of the washers W, one of the same from each of the screws $S^a$ and $S^b$, respectively, and then by turning screw-head $S^h$ by means of wrench $S^c$ we force the tire $t$ together again within accordance of the thickness of the key K, and the two corresponding washers W removed. For this purpose three keys K are securely inserted, by means of pins and receiving-holes, between the inner sides of the outer rim of clutches C and $C^a$, as shown in Fig. 1. These keys K having the double thickness of the washers W of the latter, three washers W are placed on screw $S^a$ and three on screw $S^b$ and between the screw-head $S^h$ and the clutches C and $C^a$, respectively. It is essential that each key K should be of the thickness of two of the washers W, so that when retightening is necessary one key K and one washer W from each of the screws $S^a$ and $S^b$ is removed at the time only, thus closing always a uniform space between the outer rim of clutches C and $C^a$, as well as between the screw-head $S^h$ and clutches C and $C^a$. Should then in course of time the tire $t$ become loose again, another of the keys K and two more of the washers W can be removed in the same manner. The clutches C and $C^a$, with the keys K, are provided with pins $p$ and receiving-holes $h$, alternately, so that they are joined solidly together. The lower part of keys K is curved out to allow the passing of screw-head $S^h$. The washers W are hinged, as shown in Fig. 5, to be opened to allow the removal from around the screws $S^a$ and $S^b$. While in position, Fig. 1, they rest with their shoulders $W^s$ firmly against the offsets $C^s$ of clutches C and $C^a$. To facilitate the turning of twin screw S, the screw-head $S^h$ is provided with grooves $S^g$, whereinto the tooth $S^t$ of wrench $S^c$ is inserted when a retightening of tire $t$ should become necessary. The handle $S^m$ of wrench $S^c$ should be long enough for obtaining the leverage required to turn twin screw S. To prevent twin screw S from moving after being tightened sufficiently, a key $m$, as shown in Fig. $3^c$, is inserted into the groove $S^g$ nearest to the sides of clutches C and $C^a$ by placing the key-face $mf$ smoothly against the lower edge of the offsets $C^s$ and the keys K. Rubber washers R should be used to secure the solid tightening of the keys K and washers W.

We are aware that prior to our invention wheel-tire tighteners have been in use. We therefore do not claim such a combination broadly, but What we do claim as our invention, and desire to secure by Letters Patent, is—

1. The combination of a pair of clutches adapted for attachment to the adjacent ends of a tire and having oppositely-threaded openings, a screw oppositely threaded to draw the clutches together, a series of removable keys clamped between the adjacent ends of the clutches, and means for keeping the keys in alinement and in place.

2. The combination in a wheel-tire tightener of the clutches C and $C^a$, the twin screw S with its grooved screw-head $S^h$ and the removable keys K and washers W substantially as set forth and described 3. The combination in a wheel-tire tightener of the clutches C and $C^a$, the flanges $f$ and $f^a$, the keys K with the twin screw S, the screw-head $S^h$, the key $m$ and the washers W all substantially as set forth and for the purpose specified.

4. In a tire-tightener, the combination of a pair of blocks or clutches attached to the adjacent ends of a tire, means for drawing the blocks or clutches together to tighten the tire, a series of removable keys clamped between the adjacent ends of the tire and the blocks or clutches and extending out flush with the wearing-face of the tire, and means for holding the keys in alinement between the blocks or clutches and tire ends.

5. In a tire-tightener, the combination of a pair of clutches connected to the adjacent ends of a tire, a device for drawing the clutches together to tighten the tire, removable keys clamped between the clutches and means for holding them in alinement, and removable washers clamped between the device for drawing the clutches together and the clutches, for the purposes set forth.

6. In a tire-tightener, the combination of a pair of clutches connected to adjacent ends of a tire, a screw connecting the clutches and adapted to draw them together, removable keys clamped between the adjacent ends of the clutches, and washers clamped between the respective clutches and the respective ends of the screw, said washers being each constructed of two parts to enable them to be placed upon and taken off the screw without removing the same from the clutches.

In testimony whereof we affix our signatures, in the presence of two witnesses, this 26th day of June, 1900.

CHARLES A. ANDERSON.
  GUSTAF A. ANDERSON.

Witnesses:
 A. OHLHOFF,
 G. N. SPENCER.